Patented Nov. 4, 1941

2,261,760

UNITED STATES PATENT OFFICE 2,261,760

GOLF BALL

Bernard James Habgood, Blackley, Manchester, England, assignor to Imperial Chemical Industries Limited, a corporation of Great Britain No Drawing. Application May 18, 1939, Serial No. 274,429. In Great Britain May 19, 1938

7 Claims. (Cl. 273—62)

This invention relates to golf balls and to methods of their manufacture.

In the present practice of making golf balls, the outer casings are usually composed of gutta as the principal component. Gutta, a hydrocarbon or mixture of hydrocarbons of formula $(C_{10}H_{16})_n$, is obtained from gutta percha by removing the resinous substances, vegetable detritus and other impurities which are present in gutta percha. Gutta obtained in the above mentioned manner is a white substance which does not show up the chipping of the white paint which occurs in play. Also the removal of the resin gives improved elastic properties. Pure gutta, however, is liable to oxidize and so deteriorate in mechanical properties, and although this liability can be largely overcome by the use of small quantities of antioxidants, such use results in discoloration, particularly in the presence of iron during manufacture. Gutta has a softening point of about 60° C. and this together with susceptibility to oxidation render transport and stocking difficult under tropical climates.

In spite of the above mentioned disadvantages and difficulties in the production of golf ball casings, gutta is the most satisfactory material heretofore used for this purpose. No synthetic material has previously been proposed for the manufacture of golf balls which not only forms a satisfactory or superior golf ball casing but which also overcomes the above mentioned disadvantages of gutta.

This invention has as an object the manufacture of improved golf balls. A further object is the production of a golf ball provided with an outer casing which comprises a synthetic material which possesses to a high degree the properties most desired in golf ball construction. A still further object is an improved process for making golf balls. Other objects will appear hereinafter.

The above objects are accomplished in the manner hereinafter described by the fabrication of golf balls in which the outer casing comprises as the main ingredient a high molecular weight solid polymer of ethylene.

I have found that the mentioned polymers of ethylene not only combine such properties as toughness and resiliency, which are required in a substitute for gutta in golf ball casings, but also properties which make it a superior product to gutta for this purpose, namely, inherent chemical inertness and stability.

The ethylene polymers used in the practice of this invention are those obtained by the process described in Patents 2,153,555 and 2,188,465. The process described in the first mentioned application consists in subjecting ethylene to pressures in excess of 500 atmospheres under controlled elevated temperature conditions. This procedure results in various polymers of ethylene, the molecular weight of which varies depending particularly upon the pressure and temperature conditions employed. By using pressures of more than 1000 atmospheres and temperatures of the order of about 200° C., solid polymers of ethylene can be formed. Under these conditions the polymerization reaction takes place smoothly, requiring several hours for completion. Or the more rapid reaction described in the second mentioned application may be used. In this method a definite but small quantity of oxygen which may be as little as 0.01% but preferably 0.03% to 0.10% at 1500 atmospheres, is included in the ethylene treated. The pressures are at least 500 atmospheres and preferably at least 1000 atmospheres and below 3000 atmospheres. The temperatures are between 100° C. and 400° C. and more desirably from 150° C. to 250° C. Thus, as a specific instance of obtaining the ethylene polymer, ethylene containing 0.05% oxygen is compressed in a steel bomb to a total pressure of 1500 atmospheres and heated rapidly at 210° C. whereupon a very rapid change in pressure followed by a slow drop in pressure is observed. After five hours' heating at 210° C. the pressure is released and the product cooled. Under these conditions an 80% yield of the solid polymer, based on the ethylene used, is obtained. These solid ethylene polymers obtained as outlined above melt or soften above about 100° C., usually between about 110° C. and about 200° C. depending upon the molecular weight of the particular polymer, have a molecular weight in excess of 4000, and are essentially saturated products corresponding in composition substantially to $(CH_2)_x$. They are soluble in xylene at its boiling point and are unaffected by prolonged contact with air at ordinary temperature. These solid polymers as ordinarily prepared show a crystalline structure when subjected to X-ray diffraction analysis.

In manufacturing the improved golf balls of this invention, there is applied to an inner core a layer or coating, the principal ingredient of which is the ethylene polymer described above. The casing is then formed by molding the mentioned layer or coating under heat and pressure. If desired a white enamel paint or similar protective or decorative coating may be applied. The casing, layer or coating may be applied, for example, as two previously formed hemispherical shells, or by suitable immersion of the core in a molten mass of the casing composition or in a solution of the casing composition in a low-boiling solvent. The molding is effected in a heated spherical-shaped mold under pressure. In making the casing composition, satisfactory compositions may be made which consist only of the ethylene polymer and a small proportion of a white pigment, e. g. titanium dioxide, zinc sulfide, etc., but other ingredients may be used, e. g. a small proportion of a hydrocarbon polymer having a molecular weight in excess of 1000. Examples of such materials are gutta, natural rubber, or a synthetic rubber-like material, such as polymerized 2-chlorobutadiene-1:3 or polymerized isobutylene. These modifying ingredients may be compounded with the ethylene polymer by milling in a device capable of doing internal work, e. g. Banbury mill, or calender or mixing rolls, by mixing at a temperature above the softening point of the ethylene polymer and the modifying agent. An alternative procedure is to dissolve the components in a mutual solvent. After mixing the solvent is evaporated to recover the mix.

The following examples in which the parts are by weight further illustrate the invention:

Example I

A golf ball core, consisting of vulcanized rubber thread wound on a suitable center under tension, is placed between two molded hemispherical shells made up from a mixture of ethylene polymer (of molecular weight about 14,000) with 4% of its own weight of titanium dioxide. The core, together with the two shells, is then placed in a mold and heated to between 110° and 115° C. for a few minutes under slight pressure, the temperature is then reduced to between 95° C. and 100° C. and the pressure gradually increased, at this temperature, to about 1 to 2 tons per square inch. The mold is then rapidly cooled to about 60° C. and opened.

Example II

A golf ball core is dipped into a melted casing composition of the same ingredients as the composition of Example I, rapidly rotated in such a way as to produce an even skin of the composition over the surface. The dipping process is repeated until a sufficient thickness has been built up, and then the covered core is given a molding treatment as in Example I.

Example III

A mix of the following composition is made:

|  | Parts |
|---|---|
| Solid ethylene polymer (molecular weight about 15,000) | 84 |
| White plantation crepe rubber | 12 |
| Titanium dioxide | 4 |
|  | 100 |

The above ingredients are compounded by milling in a rotary type Banbury mill. The mix thus obtained is molded into hemispherical shells and these are molded on a golf ball core as described in Example I.

Example IV

A mix of the following composition is made:

|  | Parts |
|---|---|
| Solid ethylene polymer (molecular weight about 23,000) | 80 |
| Polymerized isobutylene (molecular weight about 200,000) | 17 |
| Titanium dioxide | 3 |
|  | 100 |

The above ingredients are compounded in the same manner as in Example III. The mix thus obtained is molded into hemispherical shells and these are molded in a golf ball core as described in Example I.

Example V

This is the same as Example III except that instead of natural rubber the same quantity of acetone-extracted neoprene is used. Neoprene is a synthetic rubber-like material made by the polymerization of 2-chlorobutadiene-1:3. The purpose of the acetone extraction is to remove coloring matter as far as possible.

The practice of this invention presents several valuable advantages over the known golf balls and over other methods of manufacture. The golf ball casings described herein possess to a high degree the physical properties most desired in golf balls and, unlike the casings made from gutta, are not subject to oxidation and deterioration in mechanical properties. The use of a synthetic material of uniform properties and composition for the natural gutta makes it possible to exercise a greater control on quality than has heretofore been possible. The products of this invention are more convenient to manufacture than those made from gutta because the ethylene polymer while thermoplastic and being capable of fabrication into golf ball covers does not show substantial oxidation (gutta in sheet form is preferably stored under water). The finished golf balls are superior to those made from gutta in respect to aging properties and resistance to abrasion during use.

As many apparently widely different embodiments of this invention may be made without departing from the spirit and scope thereof, it is to be understood that I do not limit myself to the specific embodiments thereof except as defined in the appended claims.

I claim:

1. A golf ball having a shell comprising a solid polymer of ethylene characterized by conforming in composition substantially to $(CH_2)_x$ and by showing by X-ray diffraction analysis a crystalline pattern.

2. A golf ball comprising an inner resilient core and an outer shell which comprises a solid polymer of ethylene molded around said core, said polymer conforming in constitution substantially to $(CH_2)_x$ and showing by X-ray diffraction analysis a crystalline pattern.

3. A golf ball having a shell comprising a mixture of white pigment and a solid polymer of ethylene characterized by conforming in composition substantially to $(CH_2)_x$ and by showing by X-ray diffraction analysis a crystalline pattern.

4. A golf ball having a shell comprising a mixture of solid polymer of ethylene and another hydrocarbon polymer having a molecular weight in excess of 1000, said ethylene polymer conforming in constitution substantially to $(CH_2)_x$ and showing by X-ray diffraction analysis a crystalline pattern.

5. The golf ball set forth in claim 3 in which said white pigment is titanium oxide.

6. The golf ball set forth in claim 4 in which said hydrocarbon polymer is polyisobutylene.

7. A golf ball having a shell comprising a mixture of solid polymer of ethylene and polymerized 2-chlorobutadiene-1,3, said ethylene polymer conforming in constitution substantially to $(CH_2)_x$ and showing by X-ray diffraction analysis a crystalline pattern.

BERNARD JAMES HABGOOD.